United States Patent Office 3,068,126
Patented Dec. 11, 1962

3,068,126
METHOD OF MANUFACTURING BUBBLE INSULATED WIRE
Mitsuru Rokunohe, Zenzo Yoshida, Hideo Miyamoto, Susumu Mizuno and Tsuneo Oketani, all of Tokyo, Japan, assignors to Nippon Telegraph & Telephone Public Corporation, Tokyo, Japan, a corporation of Japan
No Drawing. Filed May 4, 1959, Ser. No. 810,569
Claims priority, application Japan May 8, 1958
7 Claims. (Cl. 117—232)

The invention relates to a method of manufacturing wire insulated with a coating of foam-like synthetic resin which coating method may or may not include the addition of a bubble generating agent to the solution of synthetic resin which is applied to the wire.

A method of manufacturing wire, insulated with foamed synthetic resin, in which method a bubble generating agent is dissolved or mixed into the solution of synthetic resin, a bare wire is led through this solution, the so coated wire is then heated for the purpose of evaporating and removing the flux or solvent, and then the coated wire is treated in a heated oven, has been described in United States application, Serial No. 750,171, filed July 22, 1958, and now abandoned, by two of the inventors named in this application.

The present invention relates to an improvement in the method described in said application and aims especially to obtain insulated fine wire by rendering the size of bubbles to be formed in the coating as small as possible. The present inventors have discovered that extremely fine independent bubbles with a diameter ranging from 10 to 20 microns can be generated and contained within the coating, when a bare wire coated with the solution of synthetic resin either with or without the addition of bubble generating agent, is, after being cooled, led through a heating oven to produce a foam-like structure within the coating.

In the following the principles of the present invention will be explained by means of examples.

(1) *Example With the Addition of a Bubble Generating Agent to the Resin Solution*

Taking polyethylene as the synthetic resin, the process can be carried out by passing a bare wire through a solution of synthetic resin consisting of polyethylene, toluene as flux or solvent, DPT (dinitro-pentamethylene tetraline) as the bubble generating agent, and conventional auxiliary materials that is heated up approximately to 95° C., and the wire is covered with the solution. Then, the coated wire is immediaitely cooled or chilled by passing it through cool air or through a water or alcohol filled tank and the like, and thereafter, is led through a heating oven for causing the bubble generating agent to foam and produce a foam-like structure. A foam insulated wire, containing bubbles in the size corresponding ⅕ of the bubble formed in the process hitherto known, that is to say, with a diameter of 10 to 20 microns, can be obtained by this process.

In this case the insulation coating becomes porous by cooling, it increases its hardness and the removal of the flux or solvent is accomplished without drying by heating, particularly when it is led through alcohol tank because toluene, the flux, is replaced by alcohol, and the alcohol evaporates quickly in a very short time thereafter.

(2) *Example Without the Addition of a Bubble Generating Agent*

As with the first process, the bare wire is led through the heated solution of synthetic resin, consisting, for example, of polyethylene and toluene, but not containing any bubble generating agent, and the coated wire is immediately chilled or cooled as described above. The coated wire is then heated approximately to 95° C., and bubbles form in the polyethylene coating on the surface of the wire. A foam insulated wire is thereby obtained with the bubble content as high as around 40%, with independent bubbles having a size about ⅕ of the size of the bubbles formed by the methods known hitherto, that is to say, with diameters of 10 to 20 microns. Thus, even without including a bubble generating agent, the coating gets a micro-fiber-like structure, by cooling the wire immediately after the coating with the solution of the synthetic resin is over. This process increases the hardness of coating too. When the wire is again heated up in the heating and foam forming oven a bubble insulated coating is obtained.

The aforementioned fact that the hardness increases by sudden cooling at the later stage of the first process, makes it easy as in the Example 1, where a bubble generating agent is employed, to lead the wire on the supporting roll and is consequently advantageous in the working. Moreover, in the second process, as the solution in this case is free from bubble generating agent, none of it remains in the coating after the process is finished, and therefore the electrical or physical characteristics, the resistance against chemical action etc., of the insulation is excellent in every respect. On account of the high price of bubble generating agent, it is understood that this second method, which employs no such agent results in a considerable saving and profit in production cost.

As described above, this invention is not only useful in connected with the manufacture of this sort of wire, owing to the increase of the hardness obtained through the cooling during the treatment, but is very effective from the practical point of view because bubble containing insulated wires with bubble diameters from 10 to 20 microns can be produced by this method. Such insulated wires may be small in diameter and may be gathered together and used as cores of cable, can be used as city cables, etc.

Further more, although polyethylene was the resin employed in the examples described, wires with bubble coating in any desired size and with any desired bubble size and content can be, of course, produced also with other synthetic resins, for example, with polypropylene, polyisobutylene, etc.

Thus described, we claim:

1. Method of manufacturing wire insulated with a coating of a foamed synthetic resin which method comprises: coating the wire with a heated solution of a synthetic resin, thereafter cooling said coated wire sufficiently to solidify the outer portion of the coating; and then reheating the coated wire to cause the generation of separated bubbles of 10–20 microns in diameter within said coating.

2. Method of manufacturing wire insulated with a coating of a foamed synthetic resin, which method comprises: coating the wire with a heated solution comprising a synthetic resin, a solvent and a bubble generating agent, cooling said coated wire sufficiently to solidify the outer portion of the coating; immediately after applying said coating thereto, and thereafter reheating the coated wire to a temperature sufficient to cause said bubble generating agent to produce bubbles of 10–20 microns in diameter within said coating.

3. Method of manufacturing wire insulated with a coating of a foamed synthetic resin, which method comprises: coating the wire with a heated solution of a synthetic resin in a solvent, cooling said coated wire sufficiently to solidify the outer portion of the coating; immediately after applying said coating thereto, and thereafter reheating the coated wire to a temperature sufficient to produce bubbles of 10-20 microns in diameter within said coating.

4. Method of manufacturing wire insulated with a coating of a foamed synthetic resin, which method comprises: coating the wire with a heated solution comprising a synthetic resin, a solvent and a bubble generating agent, rapidly cooling said coated wire sufficiently to solidify the outer portion of the coating; in a fluid medium immediately after applying said coating thereto, and thereafter reheating the coated wire to a temperature sufficient to cause said bubble generating agent to produce bubbles of 10-20 microns in diameter within said coating.

5. Method of manufacturing wire insulated with a coating of a foamed synthetic resin which method comprises: passing the bare wire through a heated solution comprising a synthetic resin, a solvent and a bubble generating agent, said solution being heated to a temperature below that required to cause said bubble generating agent to generate bubbles, then passing said coated wire while still substantially at the temperature of the heating solution through a cooling medium to cool the outer portion of said coating sufficiently to cause it to solidify; reheating the cooled and coated wire to a temperature sufficient to cause said bubble generating agent to generate bubbles of 10-20 microns in diameter within said coating, and then permitting the coated wire to cool to room temperature.

6. Method of manufacturing wire insulated with a coating of a foamed synthetic resin which method comprises: passing the bare wire through a heated solution comprising polyethylene, a solvent therefor and a bubble generating agent, said solution being heated to a temperature below that required to cause said bubble generating agent to generate bubbles, then passing said coated wire while still substantially at the temperature of the heating solution through a cooling medium to cool the outer portion of said coating sufficiently to cause it to solidify, reheating the cooled and coated wire to a temperature sufficient to cause said bubble generating agent to generate bubbles of 10-20 microns in diameter within said coating, and then permitting the coated wire to cool to room temperature.

7. Method of manufacturing wire insulated with a coating of a foamed synthetic resin which method comprises: passing the bare wire through a heated solution comprising a synthetic resin, a solvent and a bubble generating agent, said solution being heated to a temperature below that required to cause said bubble generating agent to generate bubbles, then passing said coated wire while still substantially at the temperature of the heating solution through a cooling liquid to reduce the temperature of said coated wire sufficiently to solidify the outer portion of the coating; removing said solvent and said liquid from said coating, reheating the coated wire to a temperature sufficient to cause said bubble generating agent to generate bubbles of 10-20 microns in diameter within said coating, and then permitting the coated wire to cool to room temperature.

References Cited in the file of this patent

UNITED STATES PATENTS

| | | |
|---|---|---|
| 2,207,822 | Rooney et al. | July 16, 1940 |
| 2,768,407 | Lindemann | Oct. 30, 1956 |
| 2,819,231 | Hahn et al. | Jan. 7, 1958 |
| 2,885,738 | Henning | May 12, 1959 |
| 2,901,774 | Pooley | Sept. 1, 1959 |

FOREIGN PATENTS

| | | |
|---|---|---|
| 1,036,960 | Germany | Aug. 21, 1958 |